Patented Feb. 25, 1947

2,416,433

UNITED STATES PATENT OFFICE 2,416,433

RESINOUS REACTION PRODUCT OF POLYMERIZED FATTY ACID ESTER, ROSIN, AND TRIALKANOLAMINE

Charles F. Brown, Naugatuck, Conn., assignor to United States Rubber Company, New York, N. Y., a corporation of New Jersey No Drawing. Application October 22, 1943,
Serial No. 507,295

9 Claims. (Cl. 260—23)

This invention relates to improvements in resin compositions.

An object of the invention is to prepare a new, adhesive, moisture-resistant composition that is flexible and stable over a wide temperature range and which is resistant to deterioration by ageing and/or chemical agents. A further object is to provide such a product as will impart these characteristics to a marked degree to mixtures into which the composition may be incorporated. Other objects will be apparent from the hereinafter detailed description.

Broadly, the invention involves the production of such a useful resinous composition from heating a mix containing an amine, such as triethanolamine, a polyester which is a reaction product obtained by reacting a dimerized higher fatty acid with a glycol such as ethylene glycol, and a resin acid or acid resin which contains such an acid, such as ordinary rosin, which contains such as abietic acid and its isomers, and pimaric acid, or homologs thereof. The amine may be either a mono- or di- substituted alkanolamine, e. g., monoethanolamine and/or diethanolamine, although these are less preferred than the tri-substituted alkanolamine. Generally, the reaction range is between about 180° C. and 300° C. The time may range from about 5 to about 15 hours.

For purposes of brevity, the expression "polyester" as used broadly herein, except where otherwise limited, means a reaction product obtained by reacting a glycol with a long chain dimerized acid of animal or vegetable origin. A "polyester of ethylene glycol" refers to such an ester wherein ethylene glycol is the glycol which is used. By dimerization is meant the combination of two molecules of the acids to produce one reactive entity and not an individual molecule.

The reactions taking place between the components present are varied and complex. The polyester when added as such probably breaks down into its several reacting groups, which groups or bodies react with other bodies present to give various products differing from the original reactants. The dimerized acid and glycol, when added separately, either provide such reactive groups, or may react to give a polyester, which in turn may give up reactive bodies as postulated. The dimerized acid and glycol, when added separately, should be added to a weight equivalent to the weight of the polyester. For example, 87.5 parts of dimerized acids of soy bean oil, and 12.5 parts of ethylene glycol, are equivalent to 100 parts of the corresponding polyester. In some cases, an excess of the glycol may be used beyond that entering into combination. As such, the glycol seems to act as a plasticizer and does not materially change the basic resin formed. In any case, the reactions are complex, resulting in a heterogeneous product having new and novel characteristics.

Polyesters suitable for practice of the present invention are sold in the trade under the names Norepol, Agripol, and the like. These polyesters may or may not be in a gel form when introduced into the reaction mixture. The dimerized acid and glycol may be added in the proper proportion separately to the reaction mixture, as illustrated in Examples III and IV below. The proportion of the reactants may be varied over a wide range and they may be admixed with other materials before, during, or after the reaction, which other materials add to the strength of the final composition without materially changing the property of the basic resin material. For example, a polyvinyl acetal resin may be additionally added. Generally, useful proportions, by weight, are exemplified by the following:

|  | Parts |
|---|---|
| Rosin | 25–100 |
| Triethanolamine | 25–100 |
| Polyester | 50–200 |
| Polyvinyl acetal resin | 0–25 |

Preferred proportions, by weight, as illustrated by the examples below, comprise about equal parts of the rosin (or its equivalent of abietic acid) and the ethanolamine, together with from about 85 to about 100 parts of the polyester based on each 100 parts of the rosin.

The following examples, in which the parts are by weight, are given in illustration of the invention:

Example I

|  | Parts |
|---|---|
| Rosin | 100 |
| Triethanolamine | 100 |
| Polyester [1] | 100 |

The rosin and the amine are mixed and heated to about 180° C. until the ingredients form a homogeneous solution. Then the polyester is added and the reaction mixture is heated together in a suitable container at 200–230° C. for about 9 or 10 hours, or until incipient gelling takes place. At the indication of gelling, the mixture is dumped from the reaction vessel and allowed to cool. The product is a dark, very sticky, adhesive, gel-like resin that is insoluble

---

[1] This polyester and that of Examples II and V is a combination prepared from a dimerized acid derived from such as soy bean oil, said dimerized acid being reacted with ethylene glycol and the reaction product containing about 12½ percent ethylene glycol.

in all of the common solvents, except the benzenoid and chlorinated hydrocarbons.

Example II

The reaction product may be further modified by the incorporation of other resins. These resins serve to add strength to the composition and do not materially change the properties of the basic resins. A preferred mixture is:

| | Parts |
|---|---|
| Rosin | 100 |
| Triethanolamine | 100 |
| Polyester [1] | 85 |
| Polyvinyl butyral resin | 15 |

The reaction mixture is heated as in Example I. The resin produced has characteristics substantially identical with that cited in Example I except that the composition is stiffer and stronger.

Analysis shows the product from Example II to have a saponification number of approximately 60, an iodine number of approximately 100, and an acid number of approximately 5.

The ageing characteristics of the gel-like resin or end product produced in the present invention, is very good, the characteristics remaining the same over an extended period of time, when stored at room conditions. The material is flexible at lower than —40° C. and is still a semi-solid at the thermal decomposition point of approximately 360–375° C.

Example III

It is not always necessary that the polyester be added as such. The ingredients may be added separately. The following example is illustrative:

| | Parts |
|---|---|
| Rosin | 100 |
| Triethanolamine | 100 |
| Dimerized acid [2] | 87.25 |
| Ethylene glycol | 12.75 |

The reactants are heated together as in Example I and the resin produced has characteristics equivalent to that of Example I.

Example IV

A resin corresponding to that produced in Example II is obtained from:

| | Parts |
|---|---|
| Rosin | 100 |
| Triethanolamine | 100 |
| Dimerized acids [2] | 74.4 |
| Ethylene glycol | 10.6 |
| Polyvinyl butyral resin | 15 |

The reactants are heated together as in Example II, and the products obtained are substantially identical in characteristics with those from Example II.

The reaction need not be carried to completion to produce new and useful products. A useful adhesive and sticky composition of matter is obtained as follows:

Example V

| | Parts |
|---|---|
| Rosin | 100 |
| Triethanolamine | 100 |
| Polyester [1] | 100 |

[1] This polyester and that of Examples II and V is a combination prepared from a dimerized acid derived from such as soy bean oil, said dimerized acid being reacted with ethylene glycol and the reaction product containing about 12½ percent ethylene glycol.

[2] Corresponds to a higher fatty acid or acids such as those from soy bean oil.

The ingredients are heated together at 200–230° C. and the course of the reaction followed by taking samples at intervals of an hour after the first six hours of heat. When the reaction has reached the point at which the resin mix does not become opalescent when rubbed with water, and is still fluid at 200° C., the heat is discontinued. This product is in a lower state of polymerization than that of the resin prepared in Example I. The composition is soluble in a wider range of materials than if the reaction is carried to completion. This solubility variation is probably due to the difference in polymerization. These solubility characteristics make it possible to combine the product with various materials to obtain a variety of adhesive mixtures, hot melt, and coating compositions.

Compositions obtained as from Examples I and II are compatible with various materials including natural resins or pitches, such as rosin or asphalt, and synthetic resins, such as polyvinyl acetates, polyvinyl acetals, certain methacrylate resins, and other synthetic resins that are generally soluble in, and compatible with benzenoid hydrocarbons. When incorporated with these types of materials, the resulting composition can be made adhesive, pliable, and otherwise modified, the adhesive and flexible qualities depending on the amount and type of resin from the present invention that is incorporated in the mix.

Solutions, and aqueous dispersions of the present composition are excellent adhesives. These adhesives may be used for combining fabrics, wood, and like fibrous materials; also, for adhesion to regenerated cellulose, cellulose esters, glass, metal, and generally most types of surfaces. Such adhesives are permanently tacky, thermoplastic, and are particularly water-resistant.

While I have shown and described various embodiments of the invention, it is to be understood that the invention is susceptible to those modifications which appear within the spirit of the invention and the scope of the appended claims.

Having thus described my invention, what I claim and desire to protect by Letters Patent is:

1. A resinous composition which is the heat reaction product, at a temperature in the range of between about 180° C. and 300° C., of a mix containing a rosin acid, a tri-alkanolamine, and a polyester of ethylene glycol and a dimerized soy bean oil fatty acid.

2. A resinous composition which is the heat reaction product, at a temperature in the range of between about 180° C. and 300° C., of a mix containing a rosin acid, a tri-alkanolamine, ethylene glycol, and a dimerized higher fatty acid derived from soy bean oil.

3. A resinous composition which is the heat reaction product, at a temperature in the range of between about 180° C. and 300° C., of a mix containing abietic acid, triethanolamine, and a polyester of ethylene glycol and a dimerized soy bean oil fatty acid.

4. A resinous composition which is the heat reaction product, at a temperature in the range of between about 180° C. and about 300° C., of a mix containing rosin, triethanolamine, a polyester of ethylene glycol and a dimerized higher fatty acid derived from soy bean oil.

5. A resinous composition which is the heat reaction product, at a temperature in the range of between about 180° C. and about 300° C., of a mix containing rosin, triethanolamine, a polyester of ethylene glycol and a dimerized soy bean oil fatty acid, and a polyvinyl acetal resin.

6. A resinous composition which is the heat reaction product, at a temperature in the range of between about 180° C. and about 300° C., of a mix containing rosin, triethanolamine, ethylene glycol, and a dimerized higher fatty acid derived from soy bean oil.

7. A resinous composition which is the heat reaction product, at a temperature in the range of between about 180° C. and about 300° C., of a mix containing rosin, triethanolamine, ethylene glycol, a dimerized soy bean oil fatty acid, and a polyvinyl acetal resin.

8. A resinous composition which is the heat reaction product, at a temperature in the range of between about 180° C. and 300° C., of a mix containing a rosin acid, a trialkanolamine, and a polyester of ethylene glycol and a dimerized fatty acid selected from the dimerizable fatty acids whose glycerides occur in animal and vegetable oils.

9. A resinous composition which is the heat reaction product, at a temperature in the range from about 180° C. to about 300° C., of a mix containing rosin, a trialkanolamine, ethylene glycol and a dimerized soy bean oil fatty acid.

CHARLES F. BROWN.

REFERENCES CITED

The following references are of record in the file of this patent:

UNITED STATES PATENTS

| Number | Name | Date |
|---|---|---|
| 2,308,530 | McManus | Jan. 19, 1943 |
| 2,312,879 | Christ | Mar. 2, 1943 |

FOREIGN PATENTS

| Number | Country | Date |
|---|---|---|
| 378,596 | British | Aug. 12, 1932 |
| 428,864 | British | May 15, 1935 |

OTHER REFERENCES

Bradley et al. Ind. & Eng. Chem., vol. 33, No. 1, Jan. 1941, pages 86-89. (Copy in Scie. Libr.)